TRANSDUCER POSITIONING SYSTEM UTILIZING RECORD WITH INTERSPERSED DATA AND POSITIONING INFORMATION

Filed Oct. 10, 1961

INVENTOR
ROBERT J. SIPPEL

BY Robert W. Berray
ATTORNEY

United States Patent Office 3,185,972
Patented May 25, 1965

3,185,972
TRANSDUCER POSITIONING SYSTEM UTILIZING RECORD WITH INTERSPERSED DATA AND POSITIONING INFORMATION

Robert J. Sippel, Poughkeepsie, N.Y., assignor to International Business Machines Corporation, New York, N.Y., a corporation of New York Filed Oct. 10, 1961, Ser. No. 144,100
17 Claims. (Cl. 340—174.1)

This invention relates to information recording and reproducing systems, and more particularly to random access memory systems which require the accurate positioning of a transducer relative to the information to be recorded or reproduced.

In the art of data processing, recourse is frequently made to systems separated from the central computer for the storage of large quantities of data. At least one of these storage systems has taken the form of one or more magnetizable rotating disks to which random access may be had by a transducer for the recording or reproduction of information. Random access storage systems are desirable because immediate access of the information can be had without having to wait for a complete cycling through the information until the desired information is reached.

Information to be recorded or reproduced is located on the rotating magnetizable disk in an orderly fashion so that accurate and rapid access may be had to the information contained thereon. The information is placed serially on a plurality of concentric tracks. So that as much information may be recorded as possible on the disk area, not only are the individual binary bits recorded as closely together as possible in a particular track, but also individual tracks on the disk are placed as close together as possible.

In order to obtain random access to the information contained on the plurality of concentric tracks, accurate means must be provided for positioning a recording or reproducing transducer precisely on the center of a desired one of the many concentric tracks. Assuming that a transducer can be positioned in the vicinity of a desired track, the further problem remains of precisely centering the transducer with respect to the desired track.

A further problem and desirable feature of a disk-type recording medium is that a disk recorded with information on one system may be removed and inserted on another system for reproduction. A problem that accompanies this feature is that mechanical differences may exist between one system and another but a transducer must still be positioned to a desired one of the many concentric tracks and maintained on the track even though the disk may not rotate smoothly.

It is therefore an object of this invention to provide a position control system which will accurately maintain a transducer relative to a predetermined track of recorded information.

Another object of the invention is to provide a transducer position indicating system wherein a single transducer may be utilized for position sensing and data recording or reproducing.

A further object of this invention is to provide a transducer position sensing system wherein very fine control over the transducer position is maintained with less stringent requirements required for placing the transducer in the vicinity of a desired track.

These and other objects of the invention are obtained by the use of a movable storage medium which presents information to a transducer. Information to be recorded or reproduced is placed in a track which has a width equal to the working area of the transducer. When the transducer is accurately positioned, the path transcribed by the transducer relative to the movable medium will be on a path coinciding with the center line of the transducer and the center line of the track. At predetermined intervals along the storage medium, reference patterns are inserted on the medium. These reference patterns consist of signal inducing representations which cooperate with the transducer. The reference patterns are made up of a series of signal-inducing areas positioned on both sides of the desired path for the transducer. Timing means are included on the moving medium which cooperate with a fixed transducer to indicate different discrete areas of the reference patterns. Circuit means are provided responsive to the reference pattern signals and the timing signals for developing signals indicative of the position of the transducer relative to the center line path. Means are provided for comparing these signals to cause correction in the position of the transducer relative to the center line to cause the transducer to transcribe the desired path.

The foregoing and other objects, features and advantages of the invention will be apparent from the following more particular description of the preferred embodiment of the invention as illustrated in the accompanying drawings.

Figures 1, 2, 3:
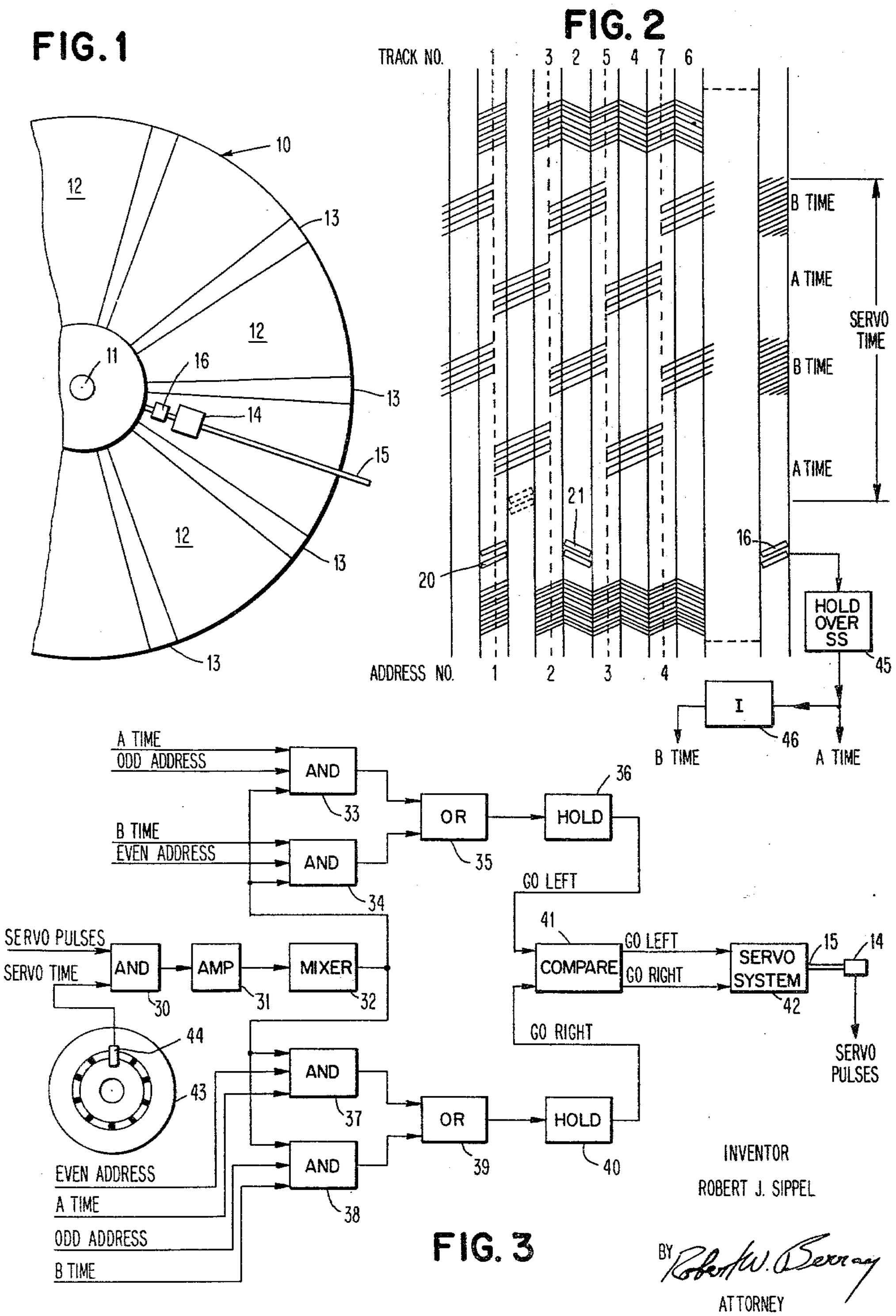
FIGURE 1 is a schematic representation of a magnetizable recording disk showing the relative position of reference patterns, data sectors and transducers.
FIGURE 2 is a representation of one of the several reference patterns showing its relationship to a plurality of adjacent addressable information tracks.
FIGURE 3 shows the logic required for interpreting the signals read by a transducer for indicating the relative position of the transducer to a predetermined track.

FIGURE 1 is a representation of the recording medium in the form of a magnetizable disk 10. The magnetizable disk 10 is mounted for rotation on a shaft 11 and is driven by any suitable means not shown. The disk 10 is divided into sectors 12 by areas of reference patterns 13. The reference patterns 13 are utilized to define a plurality of circumferential tracks for the recording or reproducing of information. Magnetically recorded information in the sectors 12 is read or recorded by transducers mounted in a housing 14. The transducers in housing 14 are magnetic heads which are responsive to the magnetically recorded information to provide electrical signals indicative of the information stored. The transducer housing 14 is located on an arm 15 which is controlled by any suitable servo positioning system for controlling the position of the transducer housing 14 relative to the surface of the disk 10. Also associated with the disk 10 is a fixed transducer 16 which is utilized in cooperation with a permanently recorded timing track. Signals induced in transducer 16 are utilized in the logic to be described later for performing the function of determining the relative position of the transducer housing 14 with respect to a desired one of many tracks on the surface of the disk 10.

FIGURE 2 shows a representation of the relative positions of the transducers, tracks, recorded data, and reference pattern representations. To achieve closer spacing between adjacent tracks of the disk, a method of recording is utilized wherein the gap of the transducers is placed at an angle with the direction of movement of the medium to provide a recorded pattern having the appearance of a herring bone. This manner of recording allows the tracks to be placed closer together without causing interference by an adjacent undesired track. The adjacent track is recorded in this manner so that the change in flux direction of the track crosses the angularly displaced transducer in such a fashion to reduce magnetic coupling with the magnetic head.

Contained in the housing 14 of FIGURE 1 are a pair of transducers 20 and 21. The transducers 20 and 21 are mechanically fixed within the housing 14 such that the spacing between their center lines is the equivalent of the spacing between three tracks on the disk 10. By placing the transducers 20 and 21 in a single housing spaced apart as they are, a single address for positioning the transducers will provide selectable access to two data tracks. A less complicated addressing scheme for a particular track is thus achieved.

The angularly displaced lines at the top and bottom of FIGURE 2 represent recorded information in the data sectors 12. The lines are a schematic representation of a magnetic flux polarity reversal. As the magnetic disk revolves past the transducers 20 and 21, each flux reversal will induce a signal in the associated transducer for each flux reversal.

Also shown in FIGURE 2 is the manner in which each of the reference pattern areas 13 is recorded. This is a permanent recording made during the manufacture of the recording disk. At the bottom of FIGURE 2 the numbers represent predetermined positions to which the transducer housing 14 is to be addressed. There are half as many address positions as there are usable tracks on the disk because two transducers are provided in the housing 14. A single address will thus provide access to two tracks. The numbers at the top of FIGURE 2 represent actual data tracks. Once the transducer housing 14 has been addressed and accurately positioned, either transducer 20 or 21 may be selectively chosen for access to either one of the two tracks being followed.

In the preferred embodiment of the invention, transducer 20 is not only utilized for recording and reproducing information data, but it is also utilized in the invention to provide the tracking information to indicate whether or not the transducer housing 14 and thus both transducers 20 and 21 are tracking along the proper and predetermined path. Transducers 20 and 21 are shown to have been addressed to address number one which gives access to tracks 1 and 2. If access were desired to tracks 3 and 4, the course positioning system, not a part of this invention, would provide control to shaft 15 to move housing 14 and thus transducers 20 and 21 to address position 2 giving access to tracks 3 and 4.

The reference pattern signal inducing flux reversals are divided into discrete areas consisting of periods of flux reversals followed by a period of no flux reversal in the direction of movement of the recording medium. Address positions 1 through 4 are defined by the series of flux reversals on either side of the center line of the desired track for transducer 20. It will be noted that the adjacent reference pattern tracks are such that periods of flux reversals in one track are adjacent to periods of no flux reversals in the other reference pattern track. To define the boundary between areas of flux reversals and areas of no flux reversals a timing track is provided on the disk 10 which cooperates with the fixed transducer 16. At the right of FIGURE 2 the periods of servo flux reversals and no flux reversals, called SERVO TIME, have been divided into designations called A TIME and B TIME. By means shown schematically in FIGURE 3, a separate format disk 43 would be rotated with the recording disk 10. The format disk would have the same configuration as disk 10 with a fixed transducer like 44. The format disk and associated transducer would generate the SERVO TIME signal to distinguish between data sectors 12 and servo sectors 13.

FIGURE 3 depicts the logic necessary for utilizing the servo information read by transducer 20. Since transducer 20 is also utilized for reading data, the format disk 43 and associated transducer 44 will designate to the position sensing circuitry that it is time for reading the reference pattern signals. SERVO PULSES which are generated in transducer 20 by the reference pattern and an enabling SERVO TIME signal from the format disk are combined at an AND circuit 30. The signals induced in transducer 20 by the reference pattern flux reversals are applied to an amplifier 31 which feeds a mixer 32. The mixer output provides one polarity pulses as an output, the amplitude of which are indicative of the position of transducer 20 relative to the center line of an address position. If the transducer 20 is not centered properly on the addressed track, the amplitude of the signal provided from mixer 32 will be one value for one of the reference pattern tracks and a different value for the other reference pattern track. First and second channels are provided for developing a signal indicative of a mistracking condition. One of these channels consists of an AND circuit 33, an AND circuit 34, an OR circuit 35, and a holding circuit 36. The other channel consists of an AND circuit 37, an AND circuit 38, an OR circuit 39, and a holding circuit 40. Holding circuits 36 and 40 may be any suitable circuit means which will provide as an output, a signal indicative of the maximum amplitude of the pulses produced from mixer 32. The outputs of holding circuits 36 and 40 are applied to a comparing device 41 where a signal is generated indicating to a suitable servo positioning system 42 whether the transducer assembly 14 of FIGURE 1 must be moved right or left in order to place transducer 20 of FIGURE 2 exactly on the center line of an addressed track. A suitable servo system 42 is described in U.S. Patent 3,034,111 issued to A. S. Hoagland et al. May 8, 1962 entitled "Data Storage System" which is assigned to the assignee of this application.

The operation of the invention will now be described by referring to FIGURES 2 and 3. Let it be assumed that it is desired that transducer 20 transcribe a path along the center line of ADDRESS NO. 1. This is an ODD ADDRESS and therefore AND circuits 33 and 38 will be conditioned at A and B TIMES to present the amplitude of pulses from mixer 32 to hold circuits 36 and 40 through OR circuits 35 and 39. The reason for making a determination between an ODD ADDRESS and an EVEN ADDRESS will be discussed later. Let it further be assumed that transducer 20 is accurately positioned on the center line of TRACK 1. In this case the amplitude of pulses generated in transducer 20 from the signal inducing flux changes will be equal and hold circuits 36 and 40 will generate signals to compare circuit 41 which are equal. The positioning mechanism 42 which controls shaft 15 and transducer housing 14 of FIGURE 1 will not be energized as the transducer 20 is accurately tracking along the center line.

Assume now that the course positioning of the transducer housing 14 has placed transducer 20 in the position shown by the dotted representation in FIGURE 2. If it is desired that transducer 20 track along ADDRESS NO. 1, at A TIME, pulses will be generated from transducer 20 but at B TIME pulses will not be generated as the transducer does not read any flux reversals. In this situation, hold circuit 36 will generate a signal but hold circuit 40 will not and compare circuit 41 will then direct the positioning mechanism 42 to cause the transducer housing 14 to go left to bring transducer 20 back to the center line of TRACK 1. It should be noted at this time that the course positioning of the transducer housing 14 may be up to 1 and ½ tracks in error, and the fine error determining system will still function properly as the transducer 20 will only read flux reversals at A TIME indicating that the transducer should be moved left to TRACK 1.

Assume now that it is desired to have transducer 20 track along the center line of ADDRESS NO. 2 or data TRACK 3. If the transducer 20 is positioned by the course positioning means to the same location as represented by the dotted representation, it will be desired to have the transducer moved to the right. To have the transducer track along an EVEN ADDRESS, AND circuits 34 and 37 will be conditioned to present pulses to hold circuits 36 and 40. At A TIME, AND circuit 37 will generate pulses to hold circuit 40 but at B TIME no pulses will be read. In this situation compare circuit 41 will direct the positioning mechanism 42 to cause the transducer 20 to move to the right to seek ADDRESS track 2. When the position of transducer 20 is corrected to track along the center line of ADDRESS track 2, equal amplitude pulses will be read at A TIME and B TIME producing a zero error condition at compare circuit 41 and the transducer positioning mechanism 42 will hold its position.

The generation of A TIME and B TIME may be by any suitable means such as a hold-over single shoe multivibrator 45 shown in FIGURE 2 wherein the application of pulses from the timing track transducer 16 will maintain the single shot in the unstable state. The absence of pulses after a predetermined duration will cause the single shot to return to its stable state. One output of the single shot may be utilized as A TIME, and, through an inverter 46, the inverted output as B TIME.

There has thus been described a system for accurately controlling the position of a transducer relative to a storage medium wherein the fine positioning of the transducer can be accomplished without requiring the course positioning to be as accurate as previously required in prior art systems. This desirable feature also aids in enabling one recording medium to be utilized on several different machines which might have mechanical differences between them. The invention further provides a fine positioning error detecting system which does not require a separate transducer mechanically coupled to the data transducers as in some prior art devices.

Although the preferred embodiment of this invention has been shown to be utilized in a rotating magnetizable disk with magnetic recording, it will be evident to those skilled in the art that other forms of recording such as light reflective patterns using light sensitive transducers could be utilized. It is also evident that other forms of recording mediums could be utilized such as magnetic tape where it is desired to index one or more transducers to a preselected one of many tracks along the tape.

While the invention has been particularly shown and described with reference to a preferred embodiment thereof, it will be understood by those skilled in the art that various changes in form and details may be made therein without departing from the spirit and scope of the invention.

What is claimed is:

1. A memory system comprising:
a movable record medium having a number of discrete areas alternately providing a periodic sequence of data and interspersed transducer positioning information,
an information responsive transducer movable relative to said movable record medium, said interspersed transducer positioning information defining a desired path to be transcribed by said transducer,
means coupled to said transducer for selecting only said positioning information from said interspersed data and positioning information,
and circuit means responsive to signals developed by the transducer operative with said positioning information for developing signals representative of the position of said transducer relative to said desired path.

2. A memory system comprising:
a magnetizable disk having a plurality of discrete transducer positioning control sectors interspersed with a like plurality of data sectors, said transducer positioning control sectors containing transducer positioning control patterns defining a plurality of concentric tracks,
a number of mechanically coupled transducers adjacent to and movable with respect to said disk and including at least one transducer responsive to signals in both said positioning control and data sectors, and circuit means responsive to signals developed by said one transducer operative with said positioning control patterns for developing signals representative of the position of said transducer relative to a desired one of said concentric tracks.

3. A memory system including the combination of:
a movable information storage medium,
a number of periodically recurring transducer positioning control patterns dividing said medium into, and interspersed with, a number of information storage areas, and further defining a predetermined path along which information is to be stored,
a transducer adjacent and movable with respect to said medium responsive to both said positioning control patterns and to said stored information and further operative to store information in the information areas,
and circuit means responsive to signals developed by said transducer operative with said positioning control patterns for developing signals representative of the position of said transducer relative to the predetermined path.

4. A memory system including the combination of:
a movable information storage medium;
a number of periodically recurring transducer positioning control patterns dividing said medium into, and interspersed with, a number of information storage areas, and further defining a predetermined path along which information is to be stored;
each of said transducer positioning control patterns including a first and second track of signal inducing representations, said tracks being positioned on opposite sides of and adjacent to the centerline of the predetermined path;
a transducer adjacent and movable with respect to said medium responsive to both said positioning control patterns and to said stored information and further operative to store information in the information areas;
and circuit means responsive to signals developed by said transducer operative with said control patterns for developing signals representative of the position of said transducer relative to the predetermined path.

5. A system in accordance with claim 4 wherein each of said transducer positioning control pattern tracks includes:
a number of discrete areas alternately presenting to said transducer periods of signal inducing representations and periods of no signal inducing representations.

6. A system in accordance with claim 5 wherein:
said discrete areas of signal inducing representations of one of said transducer positioning control tracks is adjacent to said discrete areas of no signal inducing representations of the other of said transducer positioning control tracks.

7. A system in accordance with claim 6 including:
a transducer fixed with respect to said storage medium, and a timing track operatively associated with said fixed transducer for providing timing signals to said circuit means indicative of a boundary between the alternate discrete areas of said transducer positioning control pattern tracks.

8. A system in accordance with claim 7 wherein said circuit means includes:
first and second channels, responsive to signals induced in said movable transducer and said timing signals, each operative to develop a signal indicative of the position of said movable transducer with respect to an associated one of said transducer positioning control pattern tracks.

9. A system in accordance with claim 8 wherein said circuit means includes:
means, responsive to the signals developed by said first and second channels, for indicating the relative position of said movable transducer with respect to the predetermined path.

10. A memory system including the combination of:
a movable information storage medium having a plurality of adjacent data tracks with centerlines separated by a predetermined distance,
a number of periodically recurring transducer positioning control patterns dividing said medium into, and being interspersed with, a number of information storage areas, and further defining a plurality of predetermined centerline paths along which information is to be stored,
a transducer adjacent and movable with respect to said medium responsive to said transducer positioning control patterns and stored information and further operative to store information in the information areas,
and circuit means responsive to signals developed by said transducer operative with said transducer positioning control patterns for developing signals representative of the position of said transducer relative to a particular one of said predetermined paths.

11. A system in accordance with claim 10 wherein each of said transducer positioning control patterns includes:
a plurality of adjacent tracks of signal inducing representations, each of said tracks having a width equal to twice said predetermined distance and positioned adjacent the centerline of every other one of said data tracks.

12. A system in accordance with claim 11 wherein each of said transducer positioning control pattern tracks includes:
a number of discrete areas alternately presenting to said transducer periods of signal inducing representations and periods of no signal inducing representations.

13. A system in accordance with claim 12 wherein:
said discrete areas of signal inducing representations of one of said transducer positioning control tracks is adjacent to said discrete areas of no signal inducing representations of each of the adjacent positioning control tracks.

14. A system in accordance with claim 13 including:
a transducer fixed with respect to said storage medium and a timing track operatively associated with said fixed transducer for providing timing signals to said circuit means indicative of a boundary between the alternate discrete areas of said transducer positioning control pattern tracks.

15. A memory system including the combination of:
a movable information storage medium having a plurality of adjacent data tracks with centerlines separated by a predetermined distance;
a number of periodically recurring transducer positioning control patterns dividing said medium into, and being interspersed with, a number of information storage areas, and further defining a plurality of predetermined centerline paths along which information is to be stored;
a transducer adjacent and movable with respect to said medium responsive to said transducer positioning control patterns and stored information and further operative to store information in the information areas;
and circuit means responsive to signals developed by said transducer operative with said transducer positioning control patterns for developing signals representative of the position of said transducer relative to a particular one of said predetermined paths;
each said transducer positioning control pattern including a plurality of adjacent tracks of signal inducing representations, each of said tracks having a width equal to twice said predetermined distance and positioned adjacent the centerline of every other one of said data tracks;
each of said transducer positioning control pattern tracks including a number of discrete areas alternately presenting to said transducer periods of signal inducing representations and periods of no signal inducing representations;
said discrete areas of signal inducing representations of one of said transducer positioning control tracks being adjacent to said discrete areas of no signal inducing representations of each of the adjacent positioning control tracks;
said system further including a transducer fixed with respect to said storage medium, and a timing track operatively associated with said fixed transducer for providing timing signals to said circuit means indicative of a boundary between the alternate discrete areas of said pattern tracks;
said circuit means including first and second channels, responsive to signals induced in said movable transducer and said timing signals, each operative to develop a signal indicative of the position of said movable transducer with respect to a particular one of said transducer positioning control pattern tracks.

16. A system in accordance with claim 15 wherein said circuit means includes:
means, responsive to the signals developed by said first and second channels, for indicating the relative position of said movable transducer with respect to a particular one of said predetermined centerline paths.

17. A system in accordance with claim 10 including:
a second transducer, responsive only to stored information, mechanically coupled to said first mentioned transducer separated by a distance equal to three times said predetermined distance.

References Cited by the Examiner

UNITED STATES PATENTS

| | | | |
|---|---|---|---|
| 2,751,274 | 6/56 | Andrews. | |
| 2,811,709 | 10/57 | Haselton et al. | |
| 3,007,144 | 10/61 | Hagopian. | |
| 3,023,404 | 2/62 | Dickerson. | |
| 3,034,111 | 5/62 | Hoagland et al. | 340—174.1 |
| 3,037,205 | 5/62 | Hagopian | 346—74 |

OTHER REFERENCES

Chen et al.: Digital Memory System, Electronics Magazine, pages 130 to 133, March 1959.

IRVING L. SRAGOW, *Primary Examiner.*